United States Patent [19]

Vercoulen et al.

[11] Patent Number: 5,202,211

[45] Date of Patent: Apr. 13, 1993

[54] TONER POWDER COMPRISING PARTICLES HAVING A COATING OF FLUORINE-DOPED TIN OXIDE PARTICLES

[75] Inventors: Gerardus C. P. Vercoulen, EA Velden; Ronald Groothuijse, SC Sevenum, both of Netherlands

[73] Assignee: Océ-Nederland B.V., Venlo, Netherlands

[21] Appl. No.: 650,945

[22] Filed: Feb. 5, 1991

[30] Foreign Application Priority Data

Feb. 5, 1990 [NL] Netherlands ........................ 9000268

[51] Int. Cl.$^5$ ............................................... G03G 9/08
[52] U.S. Cl. ..................................... 430/109; 430/137
[58] Field of Search ................ 430/106, 110, 137, 109

[56] References Cited

U.S. PATENT DOCUMENTS

| | | | |
|---|---|---|---|
| 3,639,245 | 2/1972 | Nelson | 252/62.1 |
| 3,925,219 | 12/1975 | Strong | 252/62.1 |
| 4,371,740 | 2/1983 | Clem | 136/264 |
| 4,431,764 | 2/1984 | Yoshizumi | 524/404 |

FOREIGN PATENT DOCUMENTS

| | | |
|---|---|---|
| 0156407 | 10/1985 | European Pat. Off. |
| 0156408 | 10/1985 | European Pat. Off. |
| 0191521 | 8/1986 | European Pat. Off. |
| 60-115944 | 6/1985 | Japan |
| 62-230617 | 10/1987 | Japan |
| 63-36268 | 2/1988 | Japan |
| 63-254465 | 10/1988 | Japan |
| 1406983 | 3/1973 | United Kingdom |

*Primary Examiner*—John Goodrow
*Attorney, Agent, or Firm*—Birch, Stewart, Kolasch & Birch

[57] ABSTRACT

A toner powder comprising toner particles which carry on their surface and/or in an edge zone close to the surface fine particles of electrically conductive material consisting of fluorine-doped tin oxide. The fluorine-doped tin oxide particles have a primary particle size of less than 0.2 micrometer and a specific electrical resistance of at most 50 ohms.meter. The fluorine content of the tin oxide is less than 10% by weight, and preferably is from 1 to 5% by weight.

9 Claims, No Drawings

TONER POWDER COMPRISING PARTICLES HAVING A COATING OF FLUORINE-DOPED TIN OXIDE PARTICLES

The invention relates to toner powder comprising toner particles which have deposited on their surface and/or embedded or partially embedded therein fine particles of fluorine-doped tin oxide.

A frequent technical requirement is to provide electrically insulating materials with an anti-static or electrically conductive coating in order to prevent electrostatic charges from accumulating on the material or in order to make the material suitable for a specific use. The coating must usually satisfy the requirement of having sufficiently high electrical conductivity under extreme conditions, particularly under very dry conditions. An additional requirement is frequently that the coating should be transparent. This latter requirement applies, for example, to conductive coatings of exposure windows or exposure cylinders of copying machines or original scanners, to transparent film materials and to electrically conductive colored toner powders which have been given the required conductivity by the application of an electrically conductive coating to the surface of the toner powder particles.

Transparent electrically conductive or anti-static coatings can be formed by applying a metal, metal oxide or metal salt, e.g., gold, chromium, nickel, palladium, indium oxide, stannic oxide or cupro-iodide, in the form of a thin film to the insulating surface, e.g. by sputtering or vapor-coating in a vacuum. These methods, however, are expensive and in many cases do not give the required good coating adhesion. Moreover, these coating methods are not always applicable, for example, they are not usable for giving fine toner powder particles an electrically conductive layer.

U.S. Pat. No. 4,431,764 describes compositions for forming transparent electrically conductive coatings comprising a film-forming binder and finely divided tin oxide having a particle size less than 0.4 micrometer, the tin oxide being doped with 0.1 to 20% by weight of antimony, in the form of $Sb_2O_3$ or $Sb_2O_5$.

The tin oxide described in that patent can also be used to form conductive layers without the aid of a film-forming binder, by softening the (thermoplastic) surface of the area to be coated, softening being carried out either by heat or by means of a solvent or solvent vapor, and by covering the softened and thus tacky surface with the tin oxide. For example, electrically conductive toner powder having a specific resistance between $10^3$ and $10^{10}$ ohms.meter can be made by softening the toner powder particles in a hot gas stream and bringing the fine tin oxide powder into the gas stream, or by intensively mixing a mixture of toner powder and fine tin oxide in a ball mill for some time so that the toner powder particles soften as a result of the frictional heat produced and the tin oxide particles are deposited on the softened surface.

Disadvantages of antimony-doped tin oxide in accordance with U.S. Pat. No. 4,431,764 are that its electrical resistance is still relatively high, and that the dry powder itself is not loose but has fairly poor flow properties, so that it is difficult to divide it finely. Conductive toner powders made with this tin oxide contain a fairly considerable amount of loose tin oxide or tin oxide insufficiently bonded to the toner powder, so that considerable soiling of the apparatus in which the toner powder is used occurs.

The invention provides a toner powder which does not have the disadvantages just mentioned. The toner powder according to the invention comprises toner particles which carry on their surface and/or in an edge zone close to the surface particles of fluorine-doped tin oxide.

The doped tin oxide powder used according to the invention consists of mainly crystalline tetragonal tin oxide which is doped with fluorine and which preferably has a primary particle size less than 0.2 micrometer and a specific electrical resistance of at most 50 ohms.m.eter. Such fluorine-doped tin oxide powder can be prepared in a process wherein an alcoholic solution of a stannic salt is combined with an aqueous solution of a fluoride, the tin hydroxide is precipitated from the liquid and separated, the separated product is dried and the dried powder is heated to a temperature of at least 500° C.

The fluorine-doped tin oxide powder differs from the known commercially available antimony-doped tin oxide powder according to U.S. Pat. No. 4,431,764 in that it has a higher electrical conductivity and better flow properties.

The powder consists mainly of crystalline, tetragonal tin oxide containing bonded fluorine (probably in the form of Sn-F bonds), has a primary particle size of less than 0.2 micrometer and a specific electrical resistance of not more than 50 ohms.meter. The percentage of fluorine in the tin oxide should be at least 1% by weight and is preferably between 1 and 10%, more particularly between 1 and 5% by weight. These latter products in particular are distinguished by a low specific electrical resistance, which is often well below 25 ohms.meter, and is usually between 1 and 15 ohms.meter depending on the preparation conditions.

The resistance of the powder is measured as follows: A cylindrical container having an inside diameter of 17.2 mm, the base of which consists of brass having a thickness of 1.5 mm, and the wall, which has an internal height of 22.9 mm, consists of Teflon having a thickness of 9 mm, is filled with an excess of powder. The filling is then compressed by crushing it ten times in a crusher made by Engelsmann A. G., of Ludwigshafen, Germany. This filling procedure is repeated twice. Excess powder is then wiped off with a ruler and a brass lid having a diameter of 17.2 mm and a mass of 55 g is placed on the column of powder. The filled container is placed in a Faraday cage and a 10 volt current (D.C.) is applied between the base and lid. The current intensity is measured after about 20 seconds. The measuring procedure (container filling and current measurement) is repeated three times, whereafter the average current intensity of the three measurements is calculated.

The resistance of the powder follows from the formula:

$$\rho = \frac{U}{I_g} \times \frac{A}{h}$$

where:
U = the applied voltage (= 10 volts)
A = contact area of lid and powder column ($= 2.32 \times 10^{-4} m^2$)
h = height of powder column ($= 2.29 \times 10^{-2} m$)
Ig = average current strength (in amps).

The fluorine content of the tin oxide powder is determined potentiometrically by means of an ion-selective fluorine electrode such as electrode number 60502150 manufactured by Messrs Metrohm A. G., Herisau, Switzerland. The procedure used for this test is the standard solution addition method as described in the brochure supplied by Metrohm A. G. and entitled "Messen in der Chemie". The solution in which the fluorine analysis is carried out is prepared according to the following procedure. The following materials are successively weighed out into a platinum crucible with a lid, the weight of which has been accurately determined: 1 g of sodium potassium carbonate, about 0.05 g of fluorine-doped tin oxide powder and 1 g of sodium potassium carbonate. The closed crucible is calcined for 2 hours and, after cooling, transferred to a 250 ml beaker, the weight of which has been accurately determined and which is filled with 30 g of demineralized water, 30 g of concentrated hydrochloric acid (specific gravity 1.19) and 10 g of a 2% solution of tartaric acid in demineralized water. The liquid is heated and stirred until the crucible contents are completely dissolved. After cooling, the pH of the solution is brought to between 4 and 8 by the addition of a concentrated potassium hydroxide solution (47% by weight). After the beaker and contents have been accurately weighed, the solution is filtered over a folded filter into a plastic bottle. The potentiometric analysis of the fluorine content is carried out with a liquid containing 40 g of the tin oxide solution described above, 40 g of buffer solution and 0.4 g of standard sodium fluoride solution in demineralized water.

The buffer solution is prepared as follows: 58.4 g of sodium chloride and 5 g of titriplex IV (Article number 8424 of Merck AG, Darmstadt, Germany) are dissolved in about 600 g of demineralized water, whereafter 60.7 g of acetic acid are added to the solution and it is made up to about 900 g with demineralized water. By the addition of sodium hydroxide pellets, the pH of the solution is then brought to between 5 and 5.5. The mass of the solution is then made up to 1000 g by the addition of demineralized water.

The concentration of the standard sodium fluoride solution is determined by measuring, by means of the ionselective fluorine electrode, the potential of a liquid containing 10 g of the above-described tin oxide solution and 10 g of buffer solution and calculating the fluorine concentration by reference to the potential as measured. For the standard solution the fluorine concentration used is 100 times the calculated concentration.

The fluorine-doped tin oxide powder is prepared according to the invention by combining a solution of a stannic salt in a water-miscible alcohol with an aqueous solution of a fluoride and separating the resulting precipitate of tin hydroxide from the liquid. This precipitate is then dried at a temperature not exceeding about room temperature and then calcined by heating it for some time to a temperature of at least 500° C. During calcination, it is heated at least until the fluorine content of the powder is at most 10% by weight and is preferably between 1 and 5% by weight.

The known stannic salts soluble in water-miscible alcohols can be used, such as stannic sulphate and stannic chloride. Stannic chloride is preferably used, dissolved in ethanol or methanol. The water-soluble fluoride may, for example, be sodium fluoride, ammonium fluoride or stannous fluoride. The latter substance is preferred because it generally gives tin oxide powders having a lower resistance than the powders prepared under otherwise identical conditions from sodium or ammonium fluoride.

Calcination of the dried tin hydroxide is carried out by heating the tin hydroxide for some time in air or an inert gas such as nitrogen. In the case of calcination in air, a condition in which the fluorine content of the powder is between 1 and 5% by weight and the resistance has reached a minimum value is fairly quickly obtained, usually within 15 minutes. If calcination is carried out in nitrogen the process is slower, so that it can be more satisfactorily controlled to give a product of constant quality. The calcination time can then run up to some hours. Calcination of the tin hydroxide can be carried out directly after drying of the tin hydroxide or at some time thereafter.

Before the tin hydroxide is calcined it is dried, since a preceding drying step has a favorable influence on the particle size of the final tin oxide powder. Drying is carried out under moderate conditions, preferably at room temperature or lower. One attractive drying method is freeze-drying. Moreover, in the preparation of the tin oxide, it is possible to promote the formation of fine particles by combining the salt solutions rapidly and with intensive agitation and adding the stannic salt solution preferably to the fluoride solution.

The fluorine-doped tin oxide powder which may be prepared as described above is particularly attractive for the manufacture of electrically conductive toner powder, in which toner particles containing thermoplastic resin are coated with a thin layer of tin oxide on their surface.

Preferably, the tin oxide powders used for this application are those which, measured by the known BET method, have a specific area of at least 50 $m^2/g$ and preferably more than 70 $m^2/g$. The coating is made in a manner known per se by softening the surface of the toner particles and applying the fine tin oxide particles to the softened surface. Suitable processes for manufacturing the toner powders according to the invention are described, for instance, in British patent specification 1406983 and U.S. Pat. No. 3,639,245.

The good flow properties of the powder according to the invention give a good coating in a short time. The fluorine-doped tin oxide powder according to the invention has the advantage over antimony-doped tin oxide of a higher electrical conductivity so that less tin oxide has to be deposited on the toner particles to achieve the same resistance level.

The invention will now be explained with reference to examples, which are presented as illustrative and not limiting in any way.

EXAMPLE 1

Preparation of Fluorine-Doped Tin Oxide Powder

A solution of 25 ml of stannic chloride in 600 ml of ethanol was rapidly added to a solution of 25 g of stannous fluoride in 1500 ml of water at 85° C. with intensive stirring. During the addition of the stannic chloride solution the pH of the reaction mixture was kept at about 3.5 by dropwise addition of ammonia. After the stannic chloride solution had been completely added, the mixture was brought to pH 7 by the addition of ammonia, whereupon the ethanol was evaporated from the mixture. The precipitate was separated from the liquid and dried by freeze-drying.

Two tin hydroxides prepared in the above way were heated under the following conditions directly after drying:

Powder 1: 15 minutes at 500° C. in air
Powder 2: 60 minutes at 500° C. in nitrogen.

The fluorine content and the electrical resistance of the resulting fluorine-doped crystalline tin oxide powders were determined in the manner described hereinbefore.

Result:

Powder 1: 3.6% by weight of fluorine, $\rho = 1.9$ ohms.meter
Powder 2: 1.7% by weight of fluorine, $\rho = 1.6$ ohms.meter The primary particle size of the two tin oxide powders was less than 0.1 micrometer.

Five other tin hydroxides (powders 3 to 7) prepared in the above-described manner were processed into tin oxide under the following conditions two months after drying:

Powder 3: 15 minutes at 500° C. in air
Powder 4: 30 minutes at 500° C. in nitrogen
Powder 5: 60 minutes at 500° C. in nitrogen
Powder 6: 120 minutes at 500° C. in nitrogen
Powder 7: 180 minutes at 500° C. in nitrogen.

The resulting tin oxide powders had a primary particle size of less than 0.1 micrometer.

The fluorine content and the electrical resistance of these powders were as follows:

Powder 3: 4.4% by weight of fluorine, $\rho = 9.2$ ohms.meter
Powder 4: 2.2% by weight of fluorine, $\rho < 1.3$ ohms.meter
Powder 5: 3.0% by weight of fluorine, $\rho < 1.3$ ohms.meter
Powder 6: 2.0% by weight of fluorine, $\rho = 1.3$ ohms.meter
Powder 7: 1.2% by weight of fluorine, $\rho = 1.9$ ohms.meter As a comparison the commercially available antimony-doped tin oxide, Mitsubishi T1, prepared according to U.S. Pat. No. 4,431,764, has a resistance of about 80-100 ohms.meter, a primary particle size less than 0.2 micrometer and a specific area of 65-75 m²/g.

EXAMPLE 2

Tin hydroxide was prepared in the manner described in Example 1 except that 25 g of ammonium fluoride was used instead of 25 g of stannous fluoride.

Four tin hydroxides prepared in this way were processed into tin oxide in the manner described below.

Powder 1: Heating in air at 500° C. for 15 minutes directly after drying.
Powder 2: Heating in nitrogen at 500° C. for 60 minutes directly after drying.
Powder 3: Heating in air at 500° C. for 15 minutes two months after drying.
Powder 4: Heating in nitrogen at 500° C. for 60 minutes two months after drying.

The fluorine content and the electrical resistance of the resulting tin oxides were as follows:

Powder 1: 4.4% by weight of fluorine, $\rho = 21.5$ ohms.meter
Powder 2: 3.0% by weight of fluorine, $\rho = 5.5$ ohms.meter
Powder 3: 6.2% by weight of fluorine, $\rho = 33.7$ ohms.meter
Powder 4: 4.1% by weight of fluorine, $\rho = 14.4$ ohms.meter

EXAMPLE 3

Two tin oxide powders 1 and 2 were prepared by the method of Example 1, the hydrates of the two powders being heated in nitrogen at 500° C. for 60 minutes two months after drying. The hydrate of powder 1 was brought to 500° C. from room temperature in 15 minutes, whereas the heating-up time for the hydrate of powder 2 was about 60 minutes. The following properties were measured for the resulting fluorine doped tin oxide powders:

Powder 1: 1.5% by weight of fluorine, $\rho = 1.2$ ohms.meter, specific area = 63 m²/g.
Powder 2: 3.9% by weight of fluorine, $\rho = 1.8$ ohms.meter, specific area = 100 m²/g.

EXAMPLE 4

The procedure of Example 1 was repeated, however, the hydrate after it had been separated from the precipitation liquid was washed with demineralized water having a temperature of 70° C. and not dried until after this step. A portion of the hydrate was heated in nitrogen at 500° C. for 60 minutes directly after drying, the heating time to 500° C. being 60 minutes. The resulting tin oxide powder had the following properties: 1.1% by weight fluorine, $\rho = 1.6$ ohms.meter, specific area = 43 m²/g. Another portion of the hydrate was processed in the same way as the first portion two months after drying. The resulting tin oxide powder had: 1% by weight of fluorine, $\rho = 2.5$ ohms.meter, specific area = 78 m²/g.

EXAMPLE 5

Preparation of a Conductive Toner Powder 400 g of polyester resin derived from fumaric acid and oxypropylated bispheno A (type Atlac of ICI) were melted and 100 g of magnetically attractable pigment (Bayferrox made by Bayer AG) were homogeneously distributed in the melt. After cooling the solid mass was ground to give particles having a particle size of between 10 and 20 micrometers.

100 g of the resulting magnetically attractable resin particles were mixed together with 7 g of fluorine-doped tin oxide (powder 2 of Example 3) in a 500 ml ball mill filled with 400 g of glass balls having a diameter between 0.6 and 3 mm. After about 90 minutes, the powder was sifted, the particles with a particle size of between 10 and 20 micrometers being isolated. The resulting toner powder had a resistance of $10^5$ ohms.meter when measured in the manner described hereinbefore. The powder was used in a printer of the type described in FIG. 1 of European Patent Application No. 0 191 521 (published on Aug. 20, 1986). After 5000 prints there was no appreciable soiling of the developing unit of the printer.

In the same way as described above, a toner powder was prepared using 8 g of commercially available antimony-doped tin oxide instead of 7 g of tin oxide powder according to Example 3. Toner powder having a resistance of about $10^5$ ohms.meter was obtained after a mixing time of about 180 minutes in a ball mill. When used in the printer according to European Patent Application No. 0 191 521 (FIG. 1), a distinct soiling of the developing unit was found after 5000 prints as a result of tin oxide particles having deposited on the parts thereof.

EXAMPLE 6

A conductive toner powder was prepared by tumbling 100 g of red-colored toner powder as described in European Patent Application No. 0 156 408, page 9, lines 33 to 36, and 7 g of fluorine-doped tin oxide (powder 2 of Example 4) in a ball mill in the manner described in Example 5. According to said European Patent Application, the redcolored toner powder is prepared by coating spherical magnetically attractable cores consisting of carbonyl iron particles completely enveloped with epoxy resin successively with granulates prepared in the following manner.

A first granulate is prepared by melting 362 g of epoxy resin (Epikote 1001 of Shell-Netherlands) and maintaining it at a temperature of about 130° C., and then adding the following ingredients to the melt with continuous mixing:

11 g of maleic anhydride
600 g of titanium dioxide
21 g of Maxillon Brilliant Flavine 10 GFF
6 g of Rhodamine F5GL The melt is intensively mixed at ±130° C. until a homogeneous mass is obtained. This mass is cooled to room temperature, and the solid mass is ground into particles having a size between 1 and 3 μm. A pink-colored granulate is obtained.

A second granulate is prepared by melting 91 g of epoxy resin (Epikote 1001 of Shell-Netherlands) and then adding the following ingredients to the melt.:

2.7 g of maleic anhydride
4.5 g of Maxillon Brilliant Flavine 10 GFF (yellow-fluorescent dye)
1.1 g of Rhodamine F5GL (orange-red fluorescent dye)
0.5 g of Flexo-red (red fluorescent dye)

The melt is mixed until a homogenous mass is obtained. After cooling, the solid mass is ground into particles having a size between 1 and 3 μm.

After about 100 minutes of tumbling, the toner powder had an electrical resistance of about $10^5$ ohms.meter. There was no appreciable color change of the toner powder as a result of coating with tin oxide. When used in a printer of the type described in FIG. 1 of European Patent Application No. 0 191 521, no appreciable soiling of the developing unit of the printer was observed after 5000 prints were made.

The invention being thus described, it will be obvious that the same may be varied in many ways. Such variations are not to be considered as a departure from the spirit and scope of the invention, and all such modifications as would be apparent to those skilled in the art are intended to be included within the scope of the following claims.

We claim:

1. A toner powder comprising toner particles having electrically conductive material on the surface and/or in an edge zone close to the surface thereof, wherein the electrically conductive material comprises fluorine-doped tin oxide.

2. A toner powder according to claim 1 in which the fluorine-doped tin oxide particles have a primary particle size less than 0.2 micrometer and a specific electrical resistance of at most 50 ohms.meter.

3. A toner powder according to claim 1 in which the fluorine content of the fluorine-doped tin oxide is from about 1 to 10% by weight.

4. A toner powder according to claim 3 in which the fluorine content of the fluorine-doped tin oxide is from 1 to 5% by weight.

5. A process for preparing a toner powder according to claim 1, wherein toner particles comprising thermoplastic resin are softened by heating and electrically conductive fine powder comprising fluorine-doped tin oxide particles is applied to the surface of the softened toner particles.

6. A process according to claim 5, wherein the fluorine-doped tin oxide particles have a primary particle size of less than 0.2 micrometer and a specific electrical resistance of at most 50 ohms.meter.

7. A process according to claim 5, wherein the fluorine content of the fluorine-doped tin oxide is from about 1 to 10% by weight.

8. A process according to claim 6, wherein the fluorine content of the fluorine-doped tin oxide is from 1 to 5% by weight.

9. A toner powder comprising toner particles having electrically conductive material consisting essentially of fluorine-doped tim oxide on the surface and/or in an edge zone close to the surface thereof.

* * * * *